S. J. LEVEEN.
STORAGE BATTERY.
APPLICATION FILED JUNE 12, 1919.

1,395,683.

Patented Nov. 1, 1921.

Inventor
Swan J. Leveen,
By Walter N. Haskell.
his Attorney

UNITED STATES PATENT OFFICE.

SWAN J. LEVEEN, OF ROCK ISLAND, ILLINOIS, ASSIGNOR OF ONE-THIRD TO CARL SHIELDS AND ONE-THIRD TO J. T. MARRON, BOTH OF ROCK ISLAND, ILLINOIS.

STORAGE BATTERY.

1,395,683.                    Specification of Letters Patent.    Patented Nov. 1, 1921.

Application filed June 12, 1919. Serial No. 303,559.

*To all whom it may concern:*

Be it known that I, SWAN J. LEVEEN, a citizen of the United States, residing at Rock Island, in the county of Rock Island and State of Illinois, have invented certain new and useful Improvements in Storage Batteries, of which the following is a specification.

My invention has reference to storage batteries, and aims to provide a novel construction and arrangements of the plates thereof whereby the efficiency is greatly increased. The invention consists primarily in forming the plates of the battery in such a form as to permit a greater amount of expansion thereof, lessening the danger of such plates becoming bent or warped by reason of the heat which is generated therein. This warping of the plates and consequent injury thereof, is one of the common faults of batteries now in use, and it is overcome by the use of my device.

Figure 1:
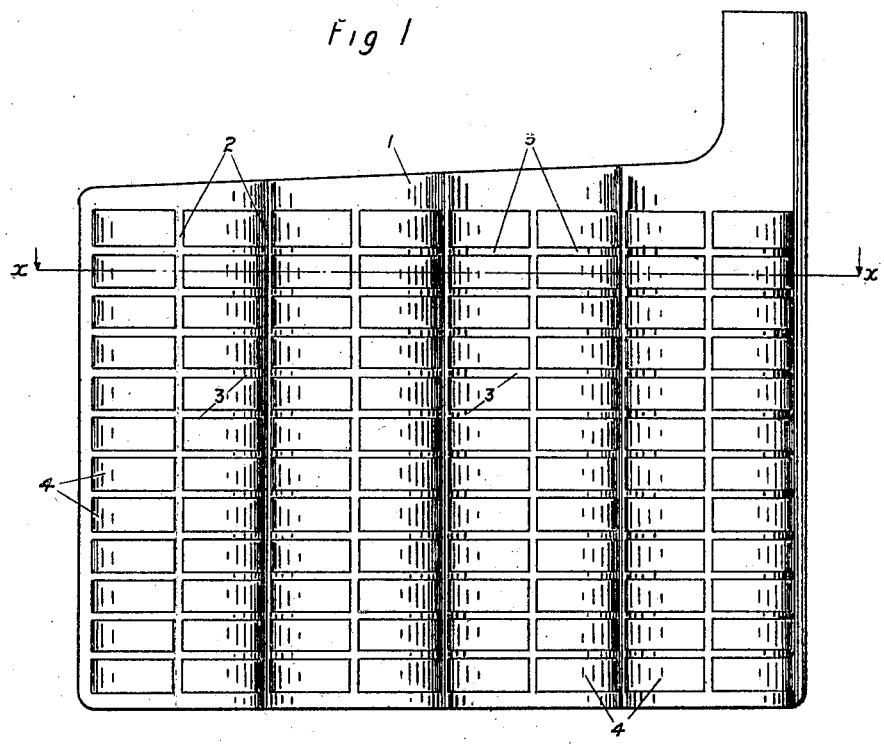
Figure 1 is a side elevation of a plate or grid, such as is used in my invention.
Figure 2:
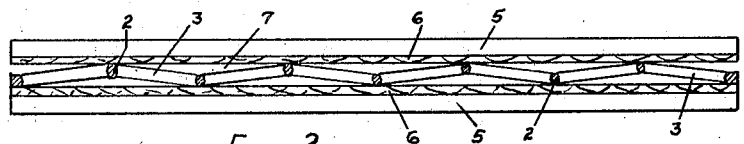
Fig. 2 is a horizontal section, on the broken line *x—x* of Fig. 1 and parts appurtenant thereto.

1 represents the frame of a grid, constructed of suitable metal, such as lead, and provided at intervals with vertical bars 2, and horizontal bars 3. The spaces within said bars are filled with a suitable composition, such as is now employed as at 4. The plate or grid thus formed is bent into a corrugated or zig-zag form, as shown in Fig. 2, the bends being at the points where the posts 2 extend vertically of the frame. This being the positive plate of the battery negative plates 5 are alternated therewith, separated from the plate 1 by separators 6, of wood or other suitable material. Said negative plates can be corrugated the same as plates 1, if desired.

In case the plate 1 becomes heated, as frequently occurs, when the battery is charged or discharged, the consequent tendency to expand is provided for by the shape thereof, such action resulting in the lengthwise expansion of the plate, without injury thereto. The spaces 7, which are formed between the plates and the adjacent separators constitute chambers for the acid contained in the cell, in which the plates are located, more space being thus provided for the acid, and a better circulation thereof, than in batteries now in use. This improved circulation also distributes the heat, which is generated in the plate, more evenly over the surface thereof.

The zig-zag arrangement of the plate sections not only allows such plate to expand longitudinally, but it stiffens and strengthens the plate vertically. Forming said plates of zig-zag sections also permits the use of thinner separators. This lowers the resistance and the discharge rate is correspondingly higher. A longer plate surface is also secured by the zig-zag form thereof, and this tends to increase the discharge or carrying capacity of the device. It also permits of the use of harder paste as the same will not be affected by the longitudinal expansion of the plate.

What I claim and desire to secure, is:

A device of the class described, comprising a frame provided with a plurality of vertical bars and a plurality of horizontal bars intersecting the same, forming vertical sections, alternate sections thereof being disposed in zig-zag relation to the adjacent sections thereof.

In testimony whereof I affix my signature.

SWAN J. LEVEEN.